United States Patent
Hamachi et al.

(10) Patent No.: US 9,654,764 B2
(45) Date of Patent: May 16, 2017

(54) STEREOSCOPIC IMAGE PROCESSING DEVICE, STEREOSCOPIC IMAGE PROCESSING METHOD, AND PROGRAM

(71) Applicant: Sharp Kabushiki Kaisha, Osaka (JP)

(72) Inventors: Jun Hamachi, Osaka (JP); Teruhisa Masui, Osaka (JP); Yousuke Nakamura, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 219 days.

(21) Appl. No.: 14/421,530

(22) PCT Filed: Aug. 12, 2013

(86) PCT No.: PCT/JP2013/071824
§ 371 (c)(1),
(2) Date: Feb. 13, 2015

(87) PCT Pub. No.: WO2014/030571
PCT Pub. Date: Feb. 27, 2014

(65) Prior Publication Data
US 2015/0222879 A1    Aug. 6, 2015

(30) Foreign Application Priority Data
Aug. 23, 2012    (JP) .................................. 2012-184489

(51) Int. Cl.
*H04N 13/02* (2006.01)
*H04N 13/00* (2006.01)
*G06K 9/46* (2006.01)
*G06T 5/00* (2006.01)
*G06T 7/593* (2017.01)

(52) U.S. Cl.
CPC ....... *H04N 13/0239* (2013.01); *G06K 9/4604* (2013.01); *G06T 5/00* (2013.01); *G06T 5/001* (2013.01); *G06T 7/593* (2017.01); *H04N 13/0022* (2013.01); *G06T 2207/10012* (2013.01); *G06T 2207/10028* (2013.01); *G06T 2207/20016* (2013.01); *G06T 2207/20021* (2013.01); *H04N 2013/0081* (2013.01)

(58) Field of Classification Search
CPC .............................. H04N 13/00; H04N 13/02
See application file for complete search history.

(56) References Cited

U.S. PATENT DOCUMENTS
2011/0063420 A1    3/2011    Masuda

FOREIGN PATENT DOCUMENTS
JP    2011-60116 A    3/2011
JP    2012-078942    *    4/2012    ............. H04N 13/00

* cited by examiner

*Primary Examiner* — Sath V Perungavoor
*Assistant Examiner* — Patricia I Young
(74) *Attorney, Agent, or Firm* — Chen Yoshimura LLP

(57) ABSTRACT

A stereoscopic image processing device including a depth map generation unit and a depth map correction unit. The depth map generation unit uses a first viewpoint image and a second viewpoint image to acquire depth values in units of blocks constituted of a plurality of pixels and generate a depth map. The depth map correction unit performs a judgment in the depth map as to whether or not a boundary region is included in a block of interest based on depth values of blocks surrounding the block of value, which is a block to be processed, and, if a boundary region is judged to be included in the block of interest, corrects the depth values in units of correction regions, which are units which are smaller than blocks, in the block of interest.

7 Claims, 7 Drawing Sheets

(a) Pattern 1         (b) Pattern 2         (c) Pattern 3         (d) Pattern 4

| 2 | 2 | 2 | 2 | 2 | 2 | 2 | 2 |
|---|---|---|---|---|---|---|---|
| 2 | 2 | 0 | 2 | 2 | 2 | 2 | 2 |
| 0 | 0 | -4 | -2 | -2 | 0 | 0 | 2 |
| 6 | 0 | -4 | -2 | 0 | 0 | 0 | 2 |
| -2 | -10 | -6 | -2 | -14 | -6 | -8 | -10 |
| -12 | -16 | -20 | -30 | -44 | -68 | -82 | -4 |

| -82 | -82 | -82 | -82 | -82 | -82 | -82 | -82 |
|---|---|---|---|---|---|---|---|
| -82 | -82 | -82 | -82 | -82 | -82 | -82 | -82 |
| -82 | -82 | -82 | -82 | -82 | -82 | -82 | -82 |
| -82 | -82 | -82 | -82 | -82 | -82 | -82 | -82 |
| -82 | -82 | -82 | -82 | -82 | -82 | -82 | -82 |
| -82 | -82 | -82 | -82 | -82 | -82 | -82 | -82 |
| -82 | -82 | -82 | -82 | -82 | -82 | -82 | -82 |
| -82 | -82 | -82 | -82 | -82 | -82 | -82 | -82 |

FIG. 4

(a) Pattern 1

|  | Large |  |
|---|---|---|
| Large |  | Small |
|  | Small |  |

(b) Pattern 2

|  | Large |  |
|---|---|---|
| Small |  | Large |
|  | Small |  |

(c) Pattern 3

|  | Small |  |
|---|---|---|
| Small |  | Large |
|  | Large |  |

(d) Pattern 4

|  | Small |  |
|---|---|---|
| Large |  | Small |
|  | Large |  |

Table 1

|  | Pattern 1 | Pattern 2 | Pattern 3 | Pattern 4 |
|---|---|---|---|---|
| pt | 0 | 1 | 2 | 3 |
| vec1 | V1 | V2 | V1 | V2 |
| vec2 | V4 | V3 | V4 | V3 |

(B)

|  | V1 |  |
|---|---|---|
| V2 | Vec | V3 |
|  | V4 |  |

FIG. 8

(A) Pattern 1

| 7 | 6 | 5 | 4 | 3 | 2 | 1 | 0 |
|---|---|---|---|---|---|---|---|
| 6 | 5 | 4 | 3 | 2 | 1 | 0 | 0 |
| 5 | 4 | 3 | 2 | 1 | 0 | 0 | 0 |
| 4 | 3 | 2 | 1 | 0 | 0 | 0 | 0 |
| 3 | 2 | 1 | 0 | 0 | 0 | 0 | 0 |
| 2 | 1 | 0 | 0 | 0 | 0 | 0 | 0 |
| 1 | 0 | 0 | 0 | 0 | 0 | 0 | 0 |
| 0 | 0 | 0 | 0 | 0 | 0 | 0 | 0 |

(B) Pattern 2

| 7 | 6 | 5 | 4 | 3 | 2 | 1 | 0 |
|---|---|---|---|---|---|---|---|
| 7 | 7 | 6 | 5 | 4 | 3 | 2 | 1 |
| 7 | 7 | 7 | 6 | 5 | 4 | 3 | 2 |
| 7 | 7 | 7 | 7 | 6 | 5 | 4 | 3 |
| 7 | 7 | 7 | 7 | 7 | 6 | 5 | 4 |
| 7 | 7 | 7 | 7 | 7 | 7 | 6 | 5 |
| 7 | 7 | 7 | 7 | 7 | 7 | 7 | 6 |
| 7 | 7 | 7 | 7 | 7 | 7 | 7 | 7 |

(C) Pattern 3

| 7 | 7 | 7 | 7 | 7 | 7 | 7 | 7 |
|---|---|---|---|---|---|---|---|
| 7 | 7 | 7 | 7 | 7 | 7 | 7 | 6 |
| 7 | 7 | 7 | 7 | 7 | 7 | 6 | 5 |
| 7 | 7 | 7 | 7 | 7 | 6 | 5 | 4 |
| 7 | 7 | 7 | 7 | 6 | 5 | 4 | 3 |
| 7 | 7 | 7 | 6 | 5 | 4 | 3 | 2 |
| 7 | 7 | 6 | 5 | 4 | 3 | 2 | 1 |
| 7 | 6 | 5 | 4 | 3 | 2 | 1 | 0 |

(D) Pattern 4

| 0 | 0 | 0 | 0 | 0 | 0 | 0 | 0 |
|---|---|---|---|---|---|---|---|
| 1 | 0 | 0 | 0 | 0 | 0 | 0 | 0 |
| 2 | 1 | 0 | 0 | 0 | 0 | 0 | 0 |
| 3 | 2 | 1 | 0 | 0 | 0 | 0 | 0 |
| 4 | 3 | 2 | 1 | 0 | 0 | 0 | 0 |
| 5 | 4 | 3 | 2 | 1 | 0 | 0 | 0 |
| 6 | 5 | 4 | 3 | 2 | 1 | 0 | 0 |
| 7 | 6 | 5 | 4 | 3 | 2 | 1 | 0 | ns the result of the processing, such as jaggi-

STEREOSCOPIC IMAGE PROCESSING DEVICE, STEREOSCOPIC IMAGE PROCESSING METHOD, AND PROGRAM

TECHNICAL FIELD

The present invention relates to a stereoscopic image processing technology. In particular, the present invention relates to correction of a depth map (range image) used in a case in which a stereoscopic image (stereo image) is processed.

BACKGROUND ART

There exists technologies which perform various processes using depth data on stereoscopic images (stereo images) formed from a right-eye image and a left-eye image obtained from different viewpoints.

In a case in which a stereoscopic image is processed using depth data, a parallax map (depth map) is acquired from a right-eye image and a left-eye image, for example, and a process is performed on the stereoscopic image using the acquired parallax map (depth map).

Specifically, one screen of a parallax map (depth map) can be acquired by using one or the other of the right-eye image or the left-eye image as a base image, calculating parallax, which is an amount of horizontal misalignment between a pixel and a pixel in another corresponding image (an image which is not the base image), for each pixel in the base image, and mapping the calculated parallax onto locations of pixels (locations in the image) corresponding to the parallax. Since range data (a depth value) for each pixel can be acquired by using the acquired parallax map (depth map), various processes corresponding to the range data (depth values) can be performed on pixels to be processed.

For example, as disclosed in Patent Document 1, an occlusion region can be detected and parallax of the occlusion region can be corrected using a parallax map (depth map).

RELATED ART DOCUMENT

Patent Document

Japanese Patent Application Laid-Open Publication No. 2011-60116

SUMMARY OF THE INVENTION

Problems to be Solved by the Invention

However, when acquiring a parallax map (depth map), an amount of computation grows large if parallax is calculated for each pixel, and rapid processing cannot be performed.

Accordingly, it is possible to acquire a parallax map (depth map) with a low amount of computation by calculating parallax by blocks made up of a plurality of pixels, thereby realizing rapid processing.

Rapid processing can be realized when performing a process on a stereoscopic image using a parallax map (depth map) acquired by calculating parallax by block, but if pixels are included in the same block which have very different parallax (for example, if a boundary between a foreground and a background is included in the same block), an appropriate process may sometimes not be executed if processing is performed on pixels included in the block using parallax or range data (depth values) acquired from a parallax map.

In such cases, side-effects sometimes occur in a stereoscopic image, which is the result of the processing, such as jaggi-ness occurring inside the block (the block including pixels with very different parallax (depth values)).

Accordingly, in light of these problems, the present invention has as an aim to realize a stereoscopic image processing device, a stereoscopic image processing method, and a program whereby a parallax map (depth map) can be acquired with a low amount of computation, and stereoscopic image processing that has high precision can be executed.

Means for Solving the Problems

To solve these problems, a stereoscopic image processing device of a first configuration is a stereoscopic image processing device including a depth map generation unit and a depth map correction unit.

The depth map generation unit acquires depth values from a first viewpoint image and a second viewpoint image to generate a depth map, each of the depth values being assigned to respective blocks that each constitute a plurality of pixels, the depth values each representing how an image is shifted between the first viewpoint image and the second viewpoint image.

The depth map correction unit determines whether or not an edge of an object is included in a block based upon the depth values of blocks adjacent thereto, the depth map correction unit correcting the depth value originally assigned to the block containing the edge in units of correction regions that are smaller than the block, thereby finely defining depth values within the block.

Effects of the Invention

With the present invention, it is possible to realize a stereoscopic image processing device, a stereoscopic image processing method, and a program whereby a parallax map (depth map) can be acquired with a low amount of computation, and stereoscopic image processing that has high precision can be executed.

BRIEF DESCRIPTION OF THE DRAWINGS

FIG. 3 is a view schematically showing one example of a depth map.

FIG. 4 is a view showing four patterns for detecting whether or not a diagonal boundary region is included in a divided block.

FIG. 7A is a table showing a relationship among a value pt, a value vec1, and a value vec2.

FIG. 7B is a view showing a relationship between divided blocks to be processed and divided blocks that are vertically and horizontally adjacent.

FIG. 8A is a view showing a 2D data array for performing a correction process in a pattern 1.

FIG. 8B is a view showing a 2D data array for performing a correction process in a pattern 2.

FIG. 8C is a view showing a 2D data array for performing a correction process in a pattern 3.

FIG. 8D is a view showing a 2D data array for performing a correction process in a pattern 4.

DETAILED DESCRIPTION OF EMBODIMENTS

<Embodiment 1>

Embodiment 1 is described below, with reference to the drawings.

<1.1: Configuration of Stereoscopic Image Processing Device>

Figure 1:
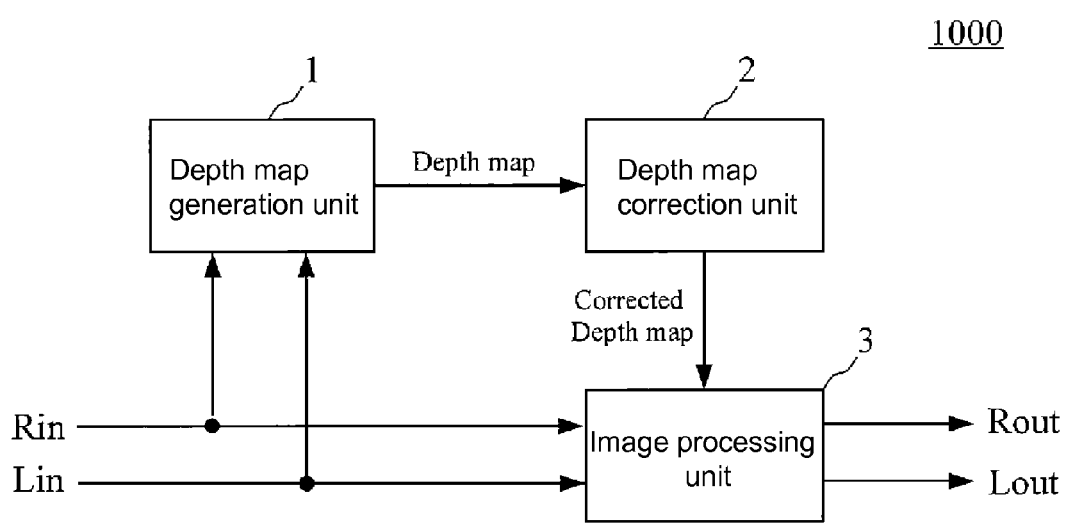
FIG. 1 is a general configuration view of a stereoscopic image processing device 1000 of Embodiment 1.

FIG. 1 is a general configuration view of a stereoscopic image processing device 1000 according to Embodiment 1.

As shown in FIG. 1, the stereoscopic image processing device 1000 includes a depth map generation unit 1, a depth map correction unit 2, and an image processing unit 3.

The depth map generation unit 1 receives a right-eye image Rin and a left-eye image Lin that constitute a stereoscopic image (stereo image), sets one or the other of the right-eye image Rin or the left-eye image Lin which have been received as a base image, and sets the other image as a reference image. The depth map generation unit 1 divides the base image into blocks of a predetermined size (blocks made up of a plurality of pixels) and executes a matching process that specifies locations in the reference image corresponding to the divided blocks (hereafter referred to a "divided blocks"). The depth map generation unit 1 executes the matching process for all of the divided blocks. The depth map generation unit 1 detects parallax (depth values) for all of the divided blocks in the base image by performing the matching process, and acquires a depth map by mapping the detected parallax (depth values) onto corresponding locations in the divided blocks. The depth map generation unit 1 then outputs the acquired depth map to the depth map correction unit 2.

The depth map correction unit 2 receives the depth map acquired from the depth map generation unit 1 and performs a judgment with respect to the input depth map as to whether or not each divided block should be a block to be corrected, and, for divided blocks judged to be blocks which should be corrected, corrects a depth value for each pixel in the divided block (details are discussed below.) The depth map correction unit 2 outputs to the image processing unit 3, as a corrected depth map, the depth map acquired by executing this correction process on the depth map acquired from the depth map generation unit 1.

The image processing unit 3 inputs the right-eye image Rin and the left-eye image Lin that constitute the stereoscopic image (stereo image), and the corrected depth map acquired from the depth map correction unit 2. The image processing unit 3 executes a desired image process on the right-eye image Rin and/or the left-eye image Lin based on the depth values (range data) for each pixel (or each block) acquired from the corrected depth map. The image processing unit 3 then outputs a right-eye image and a left-eye image after image processing as a right-eye output image Rout and a left-eye output image Lout.

<1.2: Operation of Stereoscopic Image Processing Device>

Operation of the stereoscopic image processing device 1000 thus configured is described below.

Figure 2:
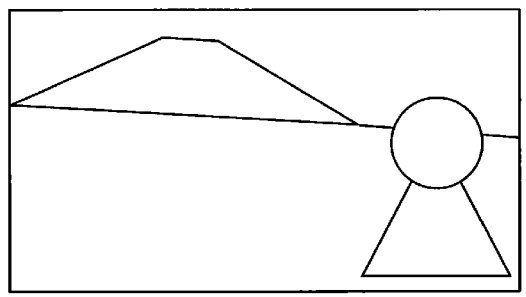
FIG. 2A is a schematic view of a left-eye image Lin for describing a method for acquiring a depth map.
FIG. 2B is a schematic view of a right-eye image Rin for describing a method for acquiring a depth map.
FIG. 2C is a schematic view of a left-eye image Lin for describing a method for acquiring a depth map.
FIG. 2D is a schematic view of a right-eye image Rin for describing a method for acquiring a depth map.
FIG. 2E is a schematic view for describing a method for acquiring a depth map.
Figure 2:
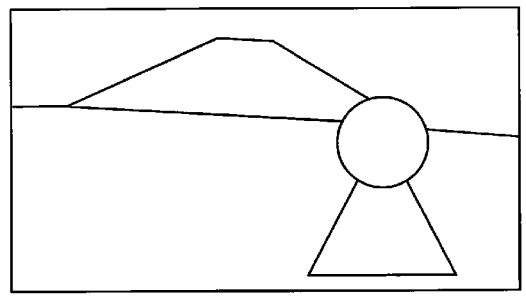
Figure 2:
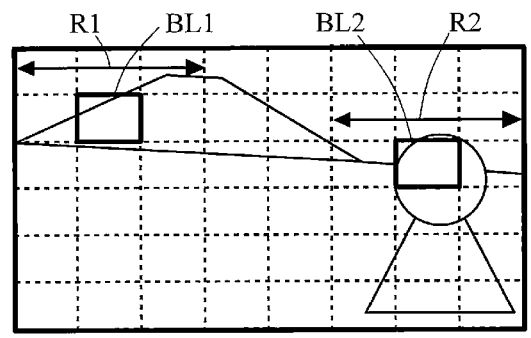
Figure 2:
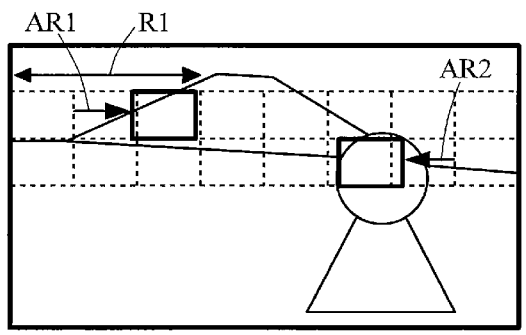
Figure 2:
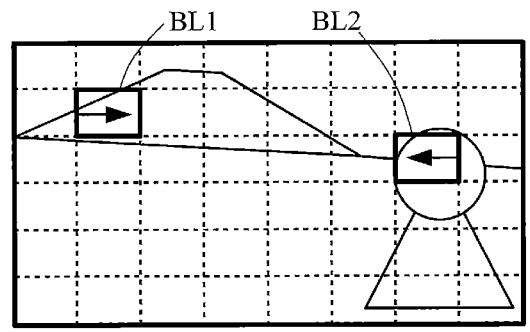

FIG. 2 is a schematic view for describing a method for acquiring a depth map. FIG. 2A is the left-eye image Lin. FIG. 2B is the right-eye image Rin. FIG. 2C is a view showing a relationship (one example) between a search region and the divided blocks set in the left-eye image Lin. FIG. 2D is a view for describing the parallax (depth values) acquired by the matching process in the right-eye image Rin. FIG. 2E is a view for describing the depth map.

A case in which the left-eye image Lin shown in FIG. 2A and the right-eye image Rin shown in FIG. 2B are input into the stereoscopic image processing device 1000 is described below.

First, the right-eye image Rin and the left-eye image Lin which make up the stereoscopic image (stereo image) are input into the depth map generation unit 1.

In the depth map generation unit 1, one or the other of the right-eye image Rin and the left-eye image Lin which have been input is set as a base image and the other image is set as a reference image. To simplify the description below, a case is described in which the left-eye image Lin is set as the base image and the right-eye image Rin is set as the reference image. Note that a method for setting the base image and the reference image may be the reverse of the above.

As shown in FIG. 2C, in the depth map generation unit 1, the left-eye image Lin, which is the base image, is divided into blocks of a predetermined size (blocks made up of a plurality of pixels), and a matching process is executed using the right-eye image Rin, which is the reference image, for each of the divided blocks (hereafter referred to as "divided blocks"). Note that a case is described below in which the divided blocks are blocks made up of n pixels×m pixels (where n,m are natural numbers).

Here, a matching process is described for a case in which a divided block BL1 in the left-eye image Lin as shown in FIG. 2C is to be processed.

The depth map generation unit 1 sets a predetermined range to left and right (a predetermined horizontal range) around a coordinate location in the right-eye image Rin, which is the reference image, which is the same as in the divided block BL1 in the right-eye image Rin. In the case of FIGS. 2C and 2D, the search region for the divided block BL1 is the region indicated by arrow Rl. Note that the search region in the devices shown in FIGS. 2C and 2D is one example, and a search region of another size may also be set, without being limited to this.

Within the set search region, the depth map generation unit 1 detects an image region in the right-eye image Rin which is most similar to the divided block BL1 in the left-eye image Lin.

Specifically, the depth map generation unit 1 detects a region which has a highest degree of matching with the divided block in the left-eye image Lin while shifting a rectangular region made up of n pixels×m pixels (a rectangular region of the same size as the divided block) left and right within the search region in the right-eye image Rin. The degree of matching is found by a SAD (sum of absolute difference) value which is a sum of an absolute value of a difference between pixel values for pixels included in the divided block BL1 and pixel values for pixels included in the rectangular region made up of n pixels×m pixels (pixel values of pixels having the same relative location in the region (block). In other words, the SAD value is found using the following (formula 1) assuming that coordinates of a pixel in a top left of the divided block BL1 are (x0,y0), a pixel value of a pixel at coordinates (x,y) included in the divided block BL1 is S(x,y), coordinates of a pixel at a top left of the rectangular region (search block) made up of n pixels×m pixels is (x1,y1), and a pixel value of the pixel at the coordinates (x,y) is D(x,y).

[Formula 1]

$$SAD = \sum_{j=0}^{m} \sum_{i=0}^{n} |S(x0+i, y0+j) - D(x1+i, y1+j)| \quad (1)$$

The depth map generation unit 1 detects a location where the SAD value (degree of matching) calculated by (formula 1) is lowest in the search region in the right-eye image Rin, and detects as a parallax (depth value) of a divided block BL an amount of misalignment with the location of the divided block BL in the left-eye image Lin. In the case of FIG. 2D, the length of the arrow AR1 is equivalent to the parallax (depth value) of the divided block BL. Note that in the present embodiment, the parallax (depth value) in a case in which there is misalignment to the right is a positive value and the parallax (depth value) in a case in which there is misalignment to the left is a negative value. Note that in the above, a case using a SAD value was described, but it is also possible for the depth map generation unit 1 to calculate the degree of matching using an SSD (sum of squared difference) value instead of the SAD value.

The depth map generation unit 1 performs the same process as above in a search region corresponding to the arrow R2 shown in FIG. 2C for a divided block BL2 in FIG. 2C as well, and thereby acquires a value corresponding to the length of the arrow AR2 shown in FIG. 2D as a parallax (depth value) of the divided block BL2.

In the case of FIGS. 2A to 2D, the parallax (depth value) of the divided block BL1 is a positive value $\alpha$ ($\alpha>0$) and the parallax (depth value) of the divided block BL2 is a negative value $-\beta$ ($\beta>0$). In other words, in a case in which the stereoscopic images shown in FIGS. 2A and 2B are displayed as stereoscopic images, a subject corresponding to the divided block BL1 is positioned further back than a virtual screen (a location with a parallax of "0"), and a subject corresponding to the divided block BL2 is positioned further forward than the virtual screen.

By executing the matching process described above for all the divided blocks, parallax (depth values) can be acquired for the divided blocks. The depth map generation unit 1 acquires a depth map by mapping the acquired parallax (depth values) to locations in the image of the divided blocks. As shown in FIG. 2E, the depth map is acquired by mapping a parallax (depth value) "+a" acquired by the matching process to a location in the divided block BL1 and a parallax (depth value) "-β" acquired by the matching process to a location in the divided block BL2, for example. Note that the depth map need not necessarily be held as image data, and may be held as a data format in which a relationship between the divided blocks and parallaxes (depth values) of the divided blocks is clear.

In this manner, the depth map acquired by the depth map generation unit 1 is output to the depth map correction unit 2.

The depth map correction unit 2 performs a judgment in the input depth map as to whether or not each block should be a block to be corrected, and, for divided blocks judged to be blocks which should be corrected, performs depth value correction for each pixel included in the divided block.

FIG. 3 shows an example of a depth map. Note that the depth map in FIG. 3 is one example of a depth map corresponding to an image area of one part of one image (one frame of an image, for example). A numerical value in each divided block in FIG. 3 indicates a depth value in each divided block, showing as an example a case in which the depth values are in the range of −128 to 127. Furthermore, FIG. 3 shows a case in which the depth map is in a format in which a depth value is held for each pixel. In other words, FIG. 3 shows a case in which one divided block is made up of 8 pixels×8 pixels, and the same depth value (depth value for the divided block) is set in all the pixels in the divided block (64 pixels). As shown in FIG. 3, depth values of all pixels (64 pixels) included in a divided block having a depth value of "−82" are all "−82," for example.

In the depth map correction unit 2, a judgment process as to whether or not a divided block to be processed should be a block to be corrected is performed by applying patterns shown in FIG. 4 to the depth map.

FIG. 4 is a view showing four patterns for detecting whether or not a diagonal boundary region is included in a divided block. FIG. 4 shows nine 3×3 divided blocks, a center divided block being a block to be processed.

A pattern 1 shown in FIG. 4(a) shows a case in which depth values (parallaxes) of adjacent divided blocks below and to the right of a block to be processed (a divided block in the center) (hereafter referred to as a "block of interest" or "block containing the edge") are smaller than a predetermined threshold value, and depth values of adjacent divided blocks above and to the left of the block of interest are higher than a predetermined threshold value. In other words, the pattern 1 is a pattern for detecting an image region in which a bottom right region is a foreground and a top left region is a background.

A pattern 2 shown in FIG. 4(b) shows a case in which depth values (parallaxes) of adjacent divided blocks below and to the left of a block of interest are smaller than a predetermined threshold value, and depth values of adjacent divided blocks above and to the right of the block of interest are higher than a predetermined threshold value. In other words, the pattern 2 is a pattern for detecting an image region in which a bottom left region is a foreground and a top right region is a background.

A pattern 3 shown in FIG. 4(c) shows a case in which depth values (parallaxes) of adjacent divided blocks above and to the left of a block of interest are smaller than a predetermined threshold value, and depth values of adjacent divided blocks below and to the right of the block of interest are higher than a predetermined threshold value. In other words, the pattern 3 is a pattern for detecting an image region in which a top left region is a foreground and a bottom right region is a background.

A pattern 4 shown in FIG. 4(d) shows a case in which depth values (parallaxes) of adjacent divided blocks above and to the right of a block of interest are smaller than a predetermined threshold value, and depth values of adjacent divided blocks below and to the left of the block of interest are higher than a predetermined threshold value. In other words, the pattern 4 is a pattern for detecting an image region in which a top right region is a foreground and a bottom left region is a background.

Note that the "predetermined threshold value" is preferably set so as to sufficiently minimize occurrence of side-effects such as jagginess when a stereoscopic image process is performed. The threshold value may be made to vary depending on conditions of a depth map being used. For example, it is possible to determine the threshold value by adopting a method for creating a table for determining threshold values from an overall depth map or a method for judging a threshold value by introducing an algorithm that judges a foreground object (a person or the like) from a shape of a foreground in an image being processed.

Figure 5:
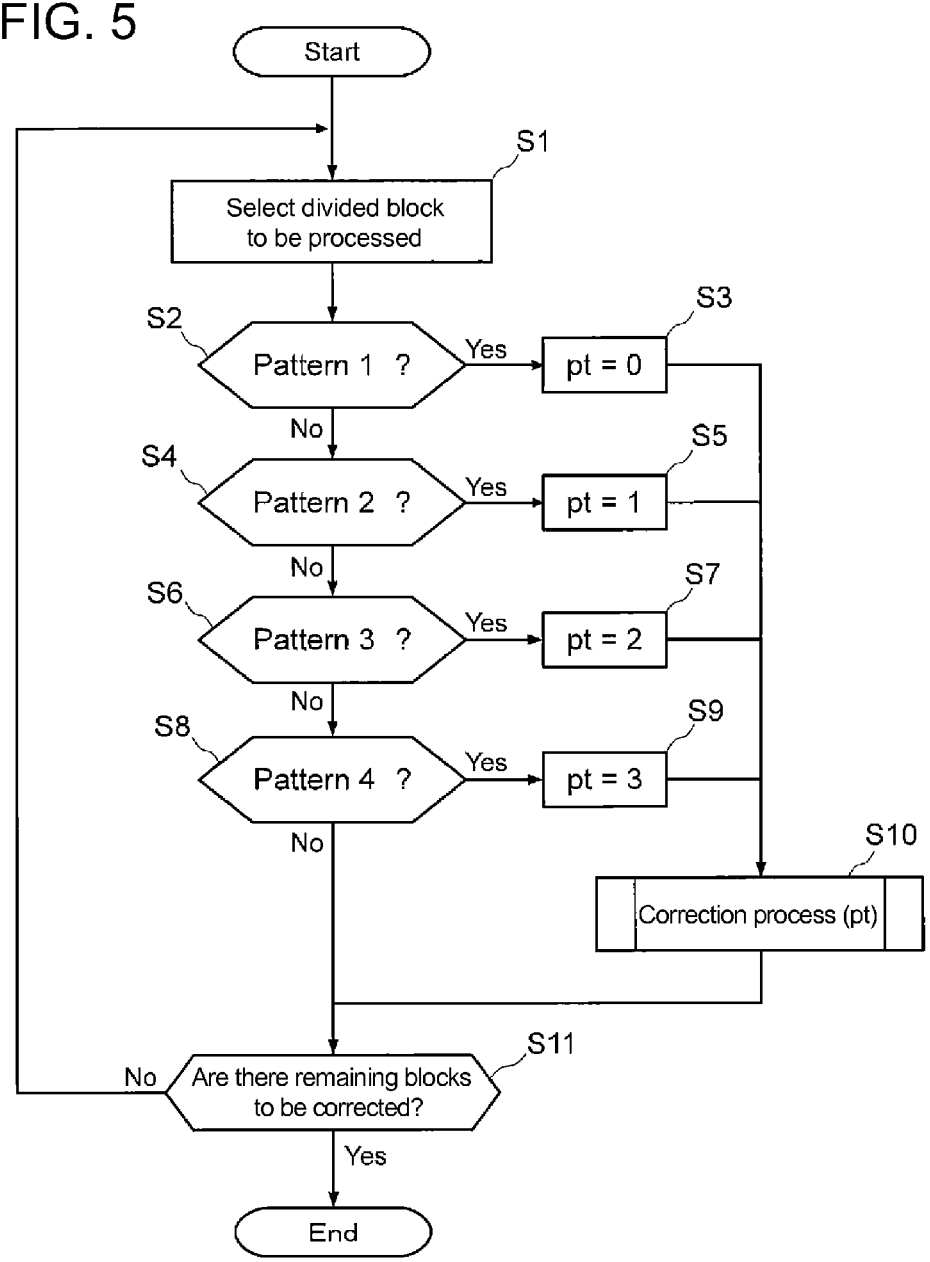
FIG. 5 is a flowchart of a depth map correction process executed by a depth map correction unit 2.
Figure 6:
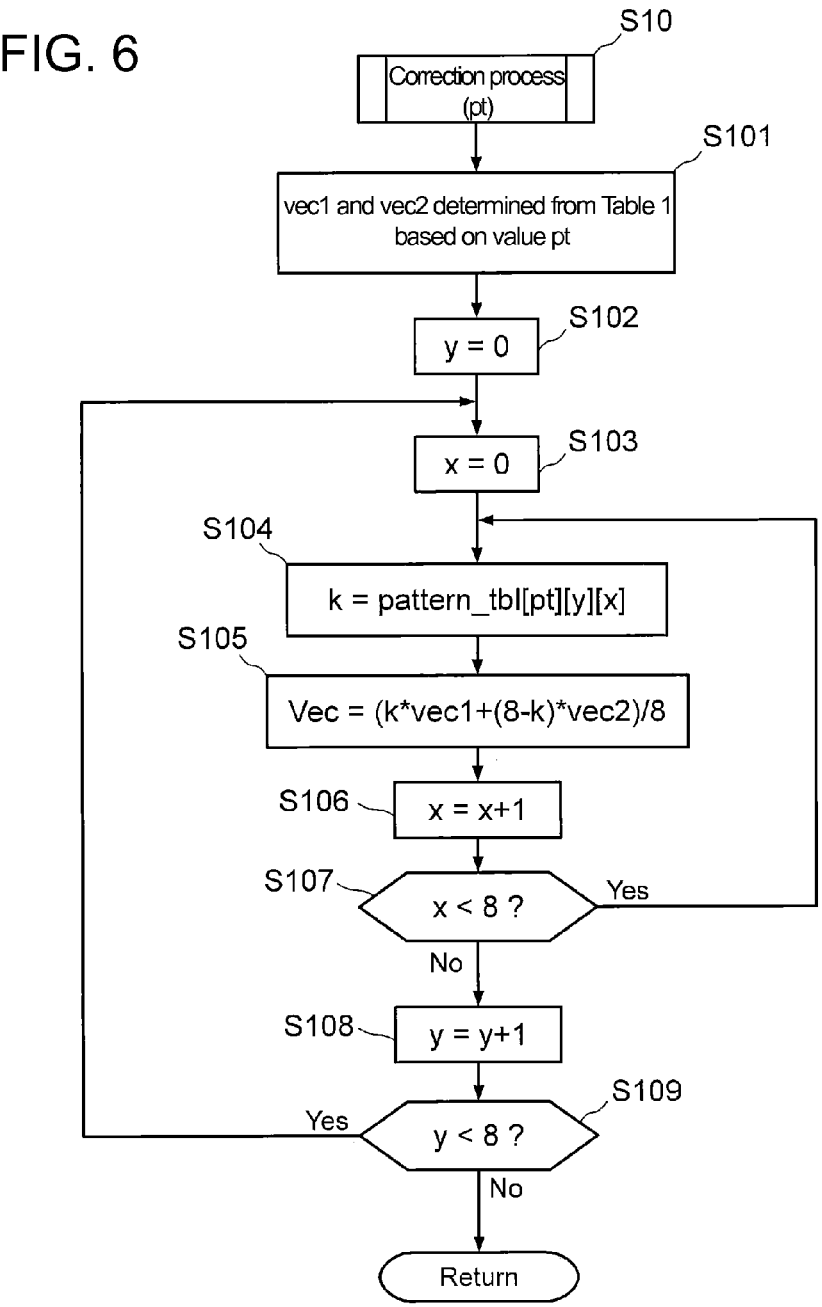
FIG. 6 is a flowchart of correction process (pt) in a depth map correction process executed by a depth map correction unit 2.

Here, the flowcharts in FIGS. 5 and 6 are used to describe a depth map correction process executed by the depth map correction unit 2.

(S1):

The depth map correction unit 2 selects a divided block, which is a block to be processed (a block of interest) in the input depth map (step S1).

<Pattern Judgment Process>

(S2 to S9):

(1) In step S2, a judgment is made as to whether or not the block of interest selected in step S1 meets the conditions of pattern 1 shown in FIG. 4. Specifically, if depth values of adjacent divided blocks above and to the left of the block of interest are larger than a predetermined threshold value th1 and depth values of adjacent divided blocks below and to the right of the block of interest are smaller than a predetermined threshold value th2 (the conditions for pattern 1) ("yes" in step S2), the depth map correction unit 2 judges that the block of interest meets the conditions of pattern 1 and sets a variable pt to pt=0 (step S3). A correction process (process in step S10) in the case of pattern 1, i.e., in a case in which pt=0, is executed in the block of interest (a correction process in step S10 is discussed below). On the other hand, if the block of interest does not meet the conditions of pattern 1 ("no" in step S2), the depth map correction unit 2 advances the process to step S4.

(2) In step S4, a judgment is made as to whether or not the block of interest meets the conditions of pattern 2 shown in FIG. 4. Specifically, if depth values of adjacent divided blocks above and to the right of the block of interest are larger than the predetermined threshold value th1 and depth values of adjacent divided blocks below and to the left of the block of interest are smaller than the predetermined threshold value th2 (the conditions for pattern 2) ("yes" in step S4), the depth map correction unit 2 judges that the block of interest meets the conditions of pattern 2 and sets a variable pt to pt=1 (step S5). A correction process (process in step S10) in the case of pattern 2, i.e., in a case in which pt=1, is executed in the block of interest (a correction process in step S10 is discussed below). On the other hand, if the block of interest does not meet the conditions of pattern 2 ("no" in step S4), the depth map correction unit 2 advances the process to step S6.

(3) In step S6, a judgment is made as to whether or not the block of interest meets the conditions of pattern 3 shown in FIG. 4. Specifically, if depth values of adjacent divided blocks below and to the right of the block of interest are larger than the predetermined threshold value th1 and depth values of adjacent divided blocks above and to the left of the block of interest are smaller than the predetermined threshold value th2 (the conditions for pattern 3) ("yes" in step S6), the depth map correction unit 2 judges that the block of interest meets the conditions of pattern 3 and sets a variable pt to pt=2 (step S7). A correction process (process in step S10) in the case of pattern 3, i.e., in a case in which pt=2, is executed in the block of interest (a correction process in step S10 is discussed below). On the other hand, if the block of interest does not meet the conditions of pattern 3 ("no" in step S6), the depth map correction unit 2 advances the process to step S8.

(4) In step S8, a judgment is made as to whether or not the block of interest meets the conditions of pattern 4 shown in FIG. 4. Specifically, if depth values of adjacent divided blocks below and to the left of the block of interest are larger than the predetermined threshold value th1 and depth values of adjacent divided blocks above and to the right of the block of interest are smaller than the predetermined threshold value th2 (the conditions for pattern 4) ("yes" in step S8), the depth map correction unit 2 judges that the block of interest meets the conditions of pattern 4 and sets a variable pt to pt=3 (step S9). A correction process (process in step S10) in the case of pattern 4, i.e., in a case in which pt=3, is executed in the block of interest (a correction process in step S10 is discussed below). On the other hand, if the block of interest does not meet the conditions of pattern 4 ("no" in step S6), the depth map correction unit 2 advances the process to step S11.

(S11):

In step S11, if a result of the judgment in step S8 is "no" or if after the process in step S10 is executed, the depth map correction unit 2 makes a judgment as to whether or not there are no unprocessed divided blocks and, if there are unprocessed divided blocks, the process returns to S1, and if there are no unprocessed divided blocks, the process is completed.

The process is thus executed for all the divided blocks in the depth map.

<Depth Value Correction Process>

Here, a correction process for each pattern in step S10 is described, with reference to the flowchart in FIG. 6.

(S101):

In step S101, the depth map correction unit 2 determines a value vec1 and a value vec2 based on a value of a variable pt indicating an applicable pattern from table 1 shown in FIG. 7A.

Table 1 shown in FIG. 7A shows the value vec1 and the value vec2 set according to the value pt. For example, if pt=0 (pattern 1), $$vec1=V1$$

$$vec2=V4$$

are set. As shown in FIG. 7B, regarding values V1 to V4, a depth value of a divided block adjacent above the divided block to be processed (the blocked marked by "Vec" in FIG. 7B) is V1, a depth value of a divided block adjacent to the left of the divided block to be processed is V2, a depth value of a divided block adjacent the right of the divided block to be processed is V3, and a depth value of a divided block adjacent below the divided block to be processed is V4.

(S102):

In step S102, the depth map correction unit 2 sets a value of y to "0." Note that the value of y is a value indicating a row in a 2D data array for correcting depth values of pixels in a divided block. Specifically, a correction process is executed for each pattern based on 2D data arrays shown in FIGS. 8A to 8D. FIG. 8A is a 2D data array for correcting the depth values of the pixels in the divided blocks in the case of pattern 1. FIG. 8B is a 2D data array for correcting the depth values of the pixels in the divided blocks in the case of pattern 2. FIG. 8C is a 2D data array for correcting the depth values of the pixels in the divided blocks in the case of pattern 3. FIG. 8D is a 2D data array for correcting the depth values of the pixels in the divided blocks in the case of pattern 4.

Note that the 2D data array shown in FIGS. 8A to 8D are examples of cases in which one divided block is made up of 8 pixels×8 pixels.

(S103):

In step S103, the depth map correction unit 2 sets a value of x to "0." Note that the value of x is a value indicating a column in a 2D data array for correcting depth values of pixels in a divided block.

(S104):

In step S104, the depth map correction unit 2 determines a coefficient k for correcting depth values in pixels to be processed (hereafter referred to as "pixels of interest"). Specifically the correction coefficient k is determined by:

$$k = \text{pattern\_tb1}[pt][y][x]$$

Note that pattern_tb1[pt][y][x] is a value determined by the variable pt, which indicates the pattern satisfied by the divided block to be processed and a relative coordinate location (x,y) inside the divided block with the pixels of interest. Specifically, this is as follows.

(1) If the pattern satisfied by the divided block to be processed is the pattern 1, then the correction coefficient k is determined by pattern_tb1[0][y][x]. In other words, pattern_tb1[0][y][x] is data of a location of (x,y) in the 2D data array shown in FIG. 8A.

(2) If the pattern satisfied by the divided block to be processed is the pattern 2, then the correction coefficient k is determined by pattern_tb1[1][y][x]. In other words, pattern_tb1[1][y][x] is data of a location of (x,y) in the 2D data array shown in FIG. 8B.

(3) If the pattern satisfied by the divided block to be processed is the pattern 3, then the correction coefficient k is determined by pattern_tb1[2][y][x]. In other words, pattern_tb1[2][y][x] is data of a location of (x,y) in the 2D data array shown in FIG. 8C.

(4) If the pattern satisfied by the divided block to be processed is the pattern 4, then the correction coefficient k is determined by pattern_tb1[3][y][x]. In other words, pattern_tb1[3][y][x] is data of a location of (x,y) in the 2D data array shown in FIG. 8D.

(S105):

In step S105, the depth map correction unit 2 uses the correction coefficient k determined in step S104 to calculate the correction value Vec of the depth value of the pixels of interest.

$$Vec = (k \times vec1 + (8-k) \times vec2)/8$$

Specifically, the correction value Vec of the depth value for each pattern is calculated as shown in (1) to (4) below.

(1) Pattern 1

If the pattern satisfied by the divided block to be processed is pattern 1, then according to FIG. 7A, vec1=V1 (depth value of the divided block adjacent above the block of interest), and vec2=V4 (depth value of the divided block adjacent below the block of interest), and therefore $$Vec = (k \times vec1 + (8-k) \times vec2)/8$$
$$= (k \times V1 + (8-k) \times V4)/8$$

are used to calculate the depth correction value Vec for the pixel of interest. If the pattern satisfied by the divided block to be processed is pattern 1, then, as shown in FIG. 8A, the correction coefficient k is set to become progressively larger (a value closer to "8") further up and to the left in the divided block and progressively smaller (a value closer to "0") further down and to the right in the divided block. As can be seen from the formulas above, the correction coefficient k is a numerical value determined by an internal ratio and therefore becomes progressively closer to the depth value V1 of the divided block adjacent above the block of interest further up and to the left in the divided block and becomes progressively closer to the depth value V4 in the divided block adjacent below the block of interest further down and to the right in the divided block.

Furthermore, since data below a diagonal line pointing up and right in the 2D data array of FIG. 8A (i.e., data in the bottom right) is set to "0," the depth correction values for pixels below the diagonal line pointing up and right in the block of interest (i.e., data in the bottom right) is the value V4. In the case of pattern 1, depth values for divided blocks in the bottom of the block of interest are smaller (in other words, the region in the bottom of the block of interest is the foreground), and therefore a correction process for depth values which gives greater weight to the foreground is executed using the 2D data array shown in FIG. 8A.

(2) Pattern 2

If the pattern satisfied by the divided block to be processed is pattern 2, then according to FIG. 7A, vec1=V2 (depth value of the divided block adjacent to the left of the block of interest), and vec2=V3 (depth value of the divided block adjacent to the right of the block of interest), and therefore $$Vec = (k \times vec1 + (8-k) \times vec2)/8$$
$$= (k \times V2 + (8-k) \times V3)/8$$

are used to calculate the depth correction value Vec for the pixel of interest. If the pattern satisfied by the divided block to be processed is pattern 2, then, as shown in FIG. 8B, the correction coefficient k is set to become progressively larger (a value closer to "8") further down and to the left in the divided block and to become progressively smaller (a value closer to "0") further up and to the right in the divided block. As can be seen from the formulas above, the correction coefficient k is a numerical value determined by an internal ratio and therefore becomes progressively closer to the depth value V2 of the divided block adjacent to the left the block of interest further down and to the left in the divided block and becomes progressively closer to the depth value V3 in the divided block adjacent to the right the block of interest further up and to the right in the divided block.

Furthermore, since data below a diagonal line pointing up and left in the 2D data array of FIG. 8B (i.e., data in the bottom left) is set to "7," the depth correction values for pixels below the diagonal line pointing up and left in the block of interest (i.e., data in the bottom left) is a value close to the value V2. In the case of pattern 2, depth values for divided blocks on the left of the block of interest are smaller (in other words, the region on the left of the block of interest is the foreground), and therefore a correction process for depth values which gives greater weight to the foreground is executed using the 2D data array shown in FIG. 8B.

(3) Pattern 3

If the pattern satisfied by the divided block to be processed is pattern 3, then according to FIG. 7A, vec1=V1 (depth value of the divided block adjacent above the block of interest), and vec2=V4 (depth value of the divided block adjacent below the block of interest), and therefore $$Vec = (k \times vec1 + (8-k) \times vec2)/8$$
$$= (k \times V1 + (8-k) \times V4)/8$$

are used to calculate the depth correction value Vec for the pixel of interest. If the pattern satisfied by the divided block to be processed is pattern 3, then, as shown in FIG. 8C, the correction coefficient k becomes progressively larger (a value closer to "8") further up and to the left in the divided block and progressively smaller (a value closer to "0") further down and to the right in the divided block. As can be seen from the formulas above, the correction coefficient k is a numerical value determined by an internal ratio and therefore becomes progressively closer to the depth value V1 of the divided block adjacent above the block of interest further up and to the left in the divided block and becomes progressively closer to the depth value V4 in the divided block adjacent below the block of interest further down and to the right in the divided block.

Furthermore, since data above a diagonal line pointing up and right in the 2D data array of FIG. 8C (i.e., data in the top left) is set to "7," the depth correction values for pixels above the diagonal line pointing up and right in the block of interest (i.e., data in the top left) is a value close to the value V1. In the case of pattern 3, depth values for divided blocks in the top of the block of interest are smaller (in other words, the region in the top of the block of interest is the foreground), and therefore a correction process for depth values which gives greater weight to the foreground is executed using the 2D data array shown in FIG. 8C.

(4) Pattern 4

If the pattern satisfied by the divided block to be processed is pattern 4, then according to FIG. 7A, vec1=V2 (depth value of the divided block adjacent to the left of the block of interest), and vec2=V3 (depth value of the divided block adjacent to the right the block of interest), and therefore $$Vec = (k \times vec1 + (8-k) \times vec2)/8$$
$$= (k \times V2 + (8-k) \times V3)/8$$

are used to calculate the depth correction value Vec for the pixel of interest. If the pattern satisfied by the divided block to be processed is pattern 4, then, as shown in FIG. 8D, the correction coefficient k is set to become progressively larger (a value closer to "8") further down and to the left in the divided block and progressively smaller (a value closer to "0") further up and to the right in the divided block. As can be seen from the formulas above, the correction coefficient k is a numerical value determined by an internal ratio and therefore becomes progressively closer to the depth value V2 of the divided block adjacent to the left of the block of interest further down and to the left in the divided block and becomes progressively closer to the depth value V3 in the divided block adjacent to the right the block of interest further up and to the right in the divided block.

Furthermore, since data above a diagonal line pointing up and left in the 2D data array of FIG. 8D (i.e., data in the top right) is set to "0," the depth correction values for pixels above the diagonal line pointing up and left in the block of interest (i.e., data in the top right) is a value close to the value V3. In the case of pattern 4, depth values for divided blocks on the right of the block of interest are smaller (in other words, the region on the right of the block of interest is the foreground), and therefore a correction process for depth values which gives greater weight to the foreground is executed using the 2D data array shown in FIG. 8D.

Thus, with (1) to (4) above, the correction value Vec of the depth value of the pixel of interest is calculated and depth value of the pixel of interest is converted to the correction value Vec.

(S106):
In step S106, the value of x is incremented by "1."
(S107):
In step S107, a judgment is made as to whether or not the value of x is smaller than "8," and if the value of x is smaller than "8," the process of steps S104 to S106 is repeatedly executed. On the other hand, if the value of x is "8" or more, the depth map correction unit 2 advances the process to step S108.

(S108):
In step S108, the value of y is incremented by "1."
(S109):
In step S109, a judgment is made as to whether or not the value of y is smaller than "8," and if the value of y is smaller than "8," the process after step S103 transition is repeatedly executed. On the other hand, if the value of y is "8" or more, the depth map correction unit 2 advances the process to step S11 (the correction process of the depth values of the pixels in the divided blocks judged to need correction is completed).

In the depth map correction unit, correction of depth values corresponding to conditions of a boundary inside a block of interest can be executed by executing the above processes. In other words, processes are executed in the depth map correction unit as in (1) to (4) below.

(1) In the case of pattern 1, namely, in a case in which there is a high possibility that there is a diagonal boundary pointing up and to the right (a region in which the depth values differ significantly) in the block of interest and there is a foreground in a bottom right region in the block of interest, the depth map correction unit corrects the depth values of the pixels in the bottom right region of the block of interest so as to be closer to the foreground (performs corrections so as to be closer to the depth values of the divided blocks in the bottom of the block of interest) and corrects the depth values of the pixels in the top left in the block of interest so as to be closer to the background (performs corrections so as to be closer to the depth values of the divided blocks in the top of the block of interest).

(2) In the case of pattern 2, namely, in a case in which there is a high possibility that there is a diagonal boundary pointing up and to the left (a region in which the depth values differ significantly) in the block of interest and there is a foreground in a bottom left region in the block of interest, the depth map correction unit corrects the depth values of the pixels in the bottom left region of the block of interest so as to be closer to the foreground (performs corrections so as to be closer to the depth values of the divided blocks on the left of the block of interest) and corrects the depth values of the pixels in the top right in the block of interest so as to be closer to the background (performs corrections so as to be closer to the depth values of the divided blocks on the right of the block of interest).

(3) In the case of pattern 3, namely, in a case in which there is a high possibility that there is a diagonal boundary pointing up and to the right (a region in which the depth values differ significantly) in the block of interest and there is a foreground in a top left region in the block of interest, the depth map correction unit corrects the depth values of the pixels in the top left region of the block of interest so as to be closer to the foreground (performs corrections so as to be closer to the depth values of the divided blocks in the top of the block of interest) and corrects the depth values of the pixels in the bottom right in the block of interest so as to be closer to the background (performs corrections so as to be closer to the depth values of the divided blocks in the bottom of the block of interest).

(4) In the case of pattern 4, namely, in a case in which there is a high possibility that there is a diagonal boundary pointing up and to the left (a region in which the depth values differ significantly) in the block of interest and there is a foreground in a top right region in the block of interest, the depth map correction unit corrects the depth values of the pixels in the top right region of the block of interest so as to be closer to the foreground (performs corrections so as to be closer to the depth values of the divided blocks on the right of the block of interest) and corrects the depth values of the pixels in the bottom left in the block of interest so as to be closer to the background (performs corrections so as to be closer to the depth values of the divided blocks on the left of the block of interest).

Thus, in the depth map correction unit, correction of depth values corresponding to conditions of a boundary inside a block of interest can be executed by executing the processes as in (1) to (4) above.

The above processes are performed by the depth map correction unit 2 and the processed depth map (corrected depth map) is output to the image processing unit 3.

With the image processing unit 3 a desired image process is executed on the right-eye image Rin and/or the left-eye image Lin based on the depth values (range data) for each pixel (or each block) acquired from the corrected depth map. With the image processing unit 3, image processing can be executed on the right-eye image Rin and/or the left-eye image Lin using the corrected depth map in which depth values have been corrected appropriately by the depth map correction unit 2 for pixels in divided blocks including diagonal boundaries. Accordingly, in a case in which a parallax conversion process, a process that adjusts pixel values using the depth values (a contrast adjustment process, for example), or the like is performed on the right-eye image Rin and/or the left-eye image Lin in the image processing unit 3, for example, occurrence of side-effects such as jagginess occurring when processing using a depth map in which depth values have been acquired in units of blocks (a depth map in which a correction process has not been performed) can be effectively minimized.

Thus, with the stereoscopic image processing device 1000 of the present embodiment, rapid processing can be realized by acquiring depth values by performing a matching process in units of blocks, and performing a stereoscopic image process using the depth values acquired in units of blocks for blocks which do not include a boundary inside a divided block. Furthermore, with the stereoscopic image processing device 1000, for blocks in which there is a high possibility of including a boundary in a divided block, correction of depth values in units of pixels is performed on depth values acquired by performing a matching process in units of blocks for applicable blocks, and a stereoscopic image process is performed using the corrected depth values for applicable blocks. In other words, with the stereoscopic image processing device 1000 of the present embodiment, a depth map is acquired using a small amount of computation by performing a matching process in units of blocks, and depth values inside applicable divided blocks are appropriately corrected only if a boundary is included in a divided block. Accordingly, with the stereoscopic image processing device 1000, rapid processing can be realized and a high-precision stereoscopic image process in which occurrence of side-effects such as jagginess is effectively suppressed can be executed.

Other Embodiments

In the above embodiment, a case in which a size of a divided block size is 8 pixels×8 pixels was described, but a size of a divided block is not limited to this, and may be other sizes.

Furthermore, in the above embodiment, a case in which depth values are corrected in units of pixels for divided blocks including boundary regions was described, but this is not a limitation. For example, it is also possible to set a region having a size which is smaller than a divided block (for example, a region of 2 pixels×2 pixels if a size of a divided block is 8 pixels×8 pixels) and perform correction of depth values in units of the region thus set (for example, the region of 2 pixels×2 pixels).

Furthermore, the stereoscopic image processing device of the above embodiment is mounted, for example, in a display device, an image capturing device, a video transmitting and receiving device, a video recording and playback device, and so on. Furthermore, all or part of the stereoscopic image processing device of the above embodiment may be realized as an integrated circuit (for example an LSI, a system LSI, or the like).

All or part of the processes of functional blocks of the above embodiment may be realized by a program. All or part of the processes of the functional blocks of the above embodiment are performed by a central processing unit (CPU) in a computer. The programs which perform these processes are stored in storage devices such as a hard disk, a ROM, or the like, and read by the ROM or a RAM and executed.

Furthermore, the processes of the above embodiment may be realized by hardware or realized by software (including cases in which the processes are realized together with an OS (operating system), middleware, or a predetermined library). Furthermore, the processes of the above embodiment may be realized through mixed processes of software and hardware.

Furthermore, an order of execution of processing methods in the above embodiment is not necessarily limited to the description of the above embodiment, and the order of execution may be switched around within a scope which does not depart from the spirit of the invention.

A computer program that causes a computer to execute the methods or a computer-readable storage medium storing the program is within the scope of the present invention. Here, for example, a flexible disk, a hard disk, a CD-ROM, an MO, a DVD, a DVD-ROM, a DVD-RAM, a BD (Blu-ray Disk), and a semiconductor memory can be given as examples of the computer-readable storage medium.

The computer program is not limited to one which is stored in the storage medium, and may be transmitted via electric communication lines, wireless or wired communication lines, a network, as represented by the Internet, or the like.

Note that a concrete constitution of the present invention is not limited to the embodiments described above, and may be modified or corrected in various ways within a range which does not depart from the spirit of the invention.

<Addendum>

Note that the present invention can be realized as follows.

A stereoscopic image processing device of a first configuration is a stereoscopic image processing device including a depth map generation unit and a depth map correction unit.

The depth map generation unit uses a first viewpoint image and a second viewpoint image to acquire depth values in units of blocks including a plurality of pixels and generate a depth map.

The depth map correction unit performs a judgment in the depth map as to whether or not a boundary region is included in a block of interest based on depth values of blocks surrounding the block of interest, which is a block to be processed, and, if a boundary region is judged to be included in the block of interest, corrects the depth values in units of correction regions, which are units that are smaller than blocks, in the block of interest.

With this stereoscopic image processing device, the depth map is generated by acquiring the depth values in units of blocks which are made up of a plurality of pixels, and therefore the depth map is acquired with a low amount of computation. Furthermore, with the stereoscopic image processing device, if a boundary region (a region in which depth values are very different) is included in the block of interest, the depth values are corrected in units of correction regions which are units that are smaller than blocks, and therefore a high-precision stereoscopic image process can be executed in a case such as when performing stereoscopic image processing using depth values.

Note that the "first viewpoint image" is, for example, an image captured from a first viewpoint (a right-eye image, for example), and the "second viewpoint image" is, for example, an image captured from a second viewpoint, which is a viewpoint that differs from the first viewpoint (a left-eye image, for example).

Furthermore, "a correction region which is smaller than a block" means a region which is smaller than a size of an applicable block; if the size of the block is 8 pixels×8 pixels, the "correction region" is a region made up of 2 pixels×2 pixels or 1 pixel, for example.

Furthermore, the "depth map" means data in which a location in an image is associated with a depth value for that location, and may be data in a 2D image format (range image), for example.

Furthermore, "in a depth map" means the same as "in a range image" in a case in which the range image in a 2D image format is generated based on data making up the depth map.

With a stereoscopic image processing device of a second configuration, the depth map correction unit in the first configuration performs processes of (1) to (4) below.

(1) In a case in which in a depth map a depth value of a top adjacent block, which is a block which is adjacent above a block of interest, and a depth value of a left adjacent block, which is a block adjacent to the left of the block of interest, are both values indicating a greater distance than a first location, which is a predetermined location, and in the depth map a depth value of a bottom adjacent block, which is a block which is adjacent below the block of interest, and a depth value of a right adjacent block, which is a block adjacent to the right of the block of interest, are both values indicating a greater proximity than a second location, which is a predetermined location, the depth values in the block of interest are corrected using the depth values of the top adjacent block and the depth values of the bottom adjacent block.

(2) If in the depth map the depth value of the top adjacent block and the depth value of the right adjacent block are both values indicating greater distance than the first location, and in the depth map the depth value of the left adjacent block and the depth value of the bottom adjacent block are both values indicating a greater proximity than the second location, the depth values in the block of interest are corrected using the depth values of the left adjacent block and the depth values of the right adjacent block.

(3) If in the depth map the depth value of the bottom adjacent block and the depth value of the right adjacent block are both values indicating greater distance than the first location, and in the depth map the depth value of the left adjacent block and the depth value of the top adjacent block are both values indicating a greater proximity than the second location, the depth values in the block of interest are corrected using the depth values of the top adjacent block and the depth values of the bottom adjacent block.

(4) If in the depth map the depth value of the left adjacent block and the depth value of the bottom adjacent block are both values indicating greater distance than the first location, and in the depth map the depth value of the top adjacent block and the depth value of the right adjacent block are both values indicating a greater proximity than the second location, the depth values in the block of interest are corrected using the depth values of the left adjacent block and the depth values of the right adjacent block.

With the stereoscopic image processing device, depth values for two adjacent blocks which are adjacent to the block of interest are used to correct the depth values in the block of interest, in accordance with patterns in (1) to (4) above. Accordingly, with the stereoscopic image processing device, depth values in the block of interest can be corrected appropriately for any of the pattern in (1) above (a case in which there is a high possibility that there is a diagonal boundary region pointing up and right in the block of interest and there is a high possibility that a bottom right portion inside the block of interest is a foreground), the pattern in (2) above (a case in which there is a high possibility that there is a diagonal boundary region pointing up and left in the block of interest and there is a high possibility that a bottom left portion inside the block of interest is a foreground), the pattern in (3) above (a case in which there is a high possibility that there is a diagonal boundary region pointing up and right in the block of interest and there is a high possibility that a top right portion inside the block of interest is a foreground), and the pattern in (4) above (a case in which there is a high possibility that there is a diagonal boundary region pointing up and left in the block of interest and there is a high possibility that a top right portion inside the block of interest is a foreground).

Note that "a value indicating a greater distance than a first position" may include a value equivalent to the first position.

Note that "a value indicating a greater distance than a second position" may include a value equivalent to the second position.

With a stereoscopic image processing device of a third configuration, the depth map correction unit in the second configuration performs processes of (1) to (4) below.

(1) If in a depth map a depth value of a top adjacent block and a depth value of a left adjacent value are both values indicating a greater distance than a first position and in the depth map a depth value of a bottom adjacent block and a depth value of a right adjacent block are both values indicating a greater proximity than a second position, the depth values in a block of interest are corrected so as to take a value closer to the depth value of the top adjacent block the closer a position of a correction region in the block of interest is to a top left edge of the block of interest and to take a value closer to the depth value of the bottom adjacent block the closer the position of the correction region in the block of interest is to bottom right edge of the block of interest.

(2) If in the depth map the depth value of the top adjacent block and the depth value of the right adjacent value are both values indicating a greater distance than the first position and in the depth map the depth value of the left adjacent block and the depth value of the bottom adjacent block are both values indicating a greater proximity than the second position, the depth values in the block of interest are corrected so as to take a value closer to the depth value of the left adjacent block the closer a position of a correction region in the block of interest is to a bottom left edge of the block of interest and to take a value closer to the depth value of the right adjacent block the closer the position of the correction region in the block of interest is to top right edge of the block of interest.

(3) If in the depth map a depth value of a bottom adjacent block and the depth value of the right adjacent value are both values indicating a greater distance than the first position and in the depth map the depth value of a left adjacent block and the depth value of the top adjacent block are both values indicating a greater proximity than the second position, the depth values in the block of interest are corrected so as to take a value closer to the depth value of the top adjacent block the closer a position of a correction region in the block of interest is to a top right edge of the block of interest and to take a value closer to the depth value of the bottom adjacent block the closer the position of the correction region in the block of interest is to bottom right edge of the block of interest.

(4) If in the depth map the depth value of the left adjacent block and the depth value of the bottom adjacent value are both values indicating a greater distance than the first position and in the depth map the depth value of the top adjacent block and the depth value of the right adjacent block are both values indicating a greater proximity than the second position, the depth values in the block of interest are corrected so as to take a value closer to the depth value of the left adjacent block the closer a position of a correction region in the block of interest is to a bottom left edge of the block of interest and to take a value closer to the depth value of the right adjacent block the closer the position of the correction region in the block of interest is to top right edge of the block of interest.

With the stereoscopic image processing device, depth values for two adjacent blocks which are adjacent to the block of interest are used to correct the depth values in the block of interest so as to be closer to the adjacent block whose distance is closer in the depth map, in accordance with patterns in (1) to (4) above. Accordingly, with this stereoscopic image processing device, depth values in a block of interest can be corrected appropriately even in the case of the patterns in (1) to (4) above.

Note that it is also possible to perform processing as follows in order to correct the depth values in the block of interest so as to be closer to the depth value of the adjacent block whose distance is closest in the depth map, using depth values of two adjacent blocks on either side of the block of interest. In other words, it is also possible to find the depth values in the block of interest using an internal division process of depth values of two adjacent blocks on either side of the block of interest, and moreover to set an internal division coefficient of the internal division process so as to be closer to the depth values of the adjacent block whose distance is closest in the depth map.

Note that "a value indicating a greater distance than a first position" may include a value equivalent to the first position.

Note that "a value indicating a greater distance than a second position" may include a value equivalent to the second position.

With a stereoscopic image processing device of a fourth configuration a correction region in any of the first through third configurations is a region constituting one pixel.

With this stereoscopic image processing device depth values in a block of interest can thus be corrected in units of one pixel.

A stereoscopic image processing method, which is a first method, is a stereoscopic image processing method including a depth map generation step and a depth map correction step.

The depth map generation step uses a first viewpoint image and a second viewpoint image to acquire depth values in units of blocks constituted of a plurality of pixels and generate a depth map.

The depth map correction step performs a judgment in the depth map as to whether or not a boundary region is included in a block of interest based on depth values of blocks surrounding the block of value, which is a block to be processed, and, if a boundary region is judged to be included in the block of interest, corrects the depth values in units of correction regions, which are units which are smaller than blocks, in the block of interest.

A stereoscopic image processing method which delivers the same effects as the stereoscopic image processing device of the first configuration can thus be realized.

A first program is a program that causes a computer to execute a stereoscopic image processing method. The stereoscopic image processing method includes a depth map generation step and a depth map correction step.

The depth map generation step uses a first viewpoint image and a second viewpoint image to acquire depth values in units of blocks constituted of a plurality of pixels and generate a depth map.

The depth map correction step performs a judgment in the depth map as to whether or not a boundary region is included in a block of interest based on depth values of blocks surrounding the block of value, which is a block to be processed, and, if a boundary region is judged to be included in the block of interest, corrects the depth values in units of correction regions, which are units which are smaller than blocks, in the block of interest.

The program which causes a computer to execute the stereoscopic image processing method which delivers the same effects as the stereoscopic image processing device of the first configuration can thus be realized.

INDUSTRIAL APPLICABILITY

A stereoscopic image processing device, a stereoscopic image processing method, and a program according to the present invention can acquire a depth map with a small amount of computing and execute high-precision stereoscopic image processing, and are therefore useful in video equipment-related industry fields and can be implemented in these fields.

DESCRIPTION OF THE REFERENCE CHARACTERS

1000 stereoscopic image processing device
1 depth map generation unit
2 depth map correction unit
3 image processing unit

What is claimed is:

1. A stereoscopic image processing device, comprising:
a depth map generation unit that acquires depth values from a first viewpoint image and a second viewpoint image to generate a depth map, each of said depth values being assigned to respective blocks that each comprise a plurality of pixels, the depth values each representing how an image is shifted between the first viewpoint image and the second viewpoint image; and
a depth map correction unit that determines whether or not an edge of an object is included in a block based upon the depth values of blocks adjacent thereto, said depth map correction unit correcting the depth value originally assigned to the block containing said edge in units of correction regions that are smaller than said block, thereby finely defining depth values within the block,
wherein the depth map correction unit corrects the depth value in said block containing the edge such that:
(1) when the depth value in a top adjacent block and the depth value in a left adjacent block are both greater than a first prescribed threshold in magnitude and the depth value in a bottom adjacent block and the depth value in a right adjacent block are both less than a second prescribed threshold in magnitude, the depth value in the block containing said edge is corrected using the depth value in the top adjacent block and the depth value in the bottom adjacent block;
(2) when the depth value in the top adjacent block and the depth value in the right adjacent block are both greater than a first prescribed threshold in magnitude and the depth value in the left adjacent block and depth value in the bottom adjacent block are both less than a second prescribed threshold in magnitude, the depth value in the block containing said edge is corrected using the depth value in the left adjacent block and the depth value in the right adjacent block;
(3) when the depth value in the bottom adjacent block and the depth value in the right adjacent block are both greater than a first prescribed threshold in magnitude and the depth value in the left adjacent block and depth value in the top adjacent block are both less than a second prescribed threshold in magnitude, the depth value in the block containing said edge is corrected using the depth value in the top adjacent block and the depth value in the bottom adjacent block; and
(4) when the depth value in the left adjacent block and the depth value in the bottom adjacent block are both greater than a first prescribed threshold in magnitude and the depth value in the top adjacent block and depth value in the right adjacent block are both less than a second prescribed threshold in magnitude, the depth value in the block containing said edge is corrected using the depth value in the left adjacent block and the depth value in the right adjacent block.

2. The stereoscopic image processing device according to claim 1,
wherein the depth map correction unit corrects the depth value in the block containing said edge such that:
(1) when the depth value in the top adjacent block and the depth value in the left adjacent block are greater than a first prescribed threshold in magnitude and when the depth value in the bottom adjacent block and the depth value in the right adjacent block are less than a second prescribed threshold in magnitude, the depth value in said block containing the edge becomes progressively closer to the depth value in the top adjacent block in the correction regions closer to a top left edge of said block containing the edge and the depth value in said block containing the edge becomes progressively closer to the depth value in the bottom adjacent block in the correction regions closer to a bottom right edge of the block containing said edge;
(2) when the depth value in the top adjacent block and the depth value in the right adjacent block are greater than a first prescribed threshold in magnitude and when the depth value in the left adjacent block and the depth value in the bottom adjacent block are less than a second prescribed threshold in magnitude, the depth value in said block containing the edge becomes progressively closer to the depth value in the left adjacent block in the correction regions closer to a bottom left edge of said block containing the edge and the depth value in said block containing the edge becomes progressively closer to the depth value in the right adjacent block in the correction regions closer to a top right edge of the block containing the edge;
(3) when the depth value in the bottom adjacent block and the depth value in the right adjacent block are greater than a first prescribed threshold in magnitude and when the depth value in the left adjacent block and the depth value in the top adjacent block are less than a second prescribed threshold in magnitude, the depth value in said block containing the edge becomes progressively closer to the depth value in the top adjacent block in the correction regions closer to a top right edge of said block containing the edge and the depth value in said block containing the edge becomes progressively closer to the depth value in the bottom adjacent block in the correction regions closer to a bottom right edge of the block containing the edge; and
(4) when the depth value in the left adjacent block and the depth value in the bottom adjacent block are greater than a first prescribed threshold in magnitude and when the depth value in the top adjacent block and the depth value in the right adjacent block are less than a second prescribed threshold in magnitude, the depth value in said block containing the edge becomes progressively closer to the depth value in the left adjacent block in the correction regions closer to bottom left edge of said block containing the edge and the depth value in said block containing the edge becomes progressively closer to the depth value in the right adjacent block in the correction regions closer to a top right edge of the block containing the edge.

3. The stereoscopic image processing device according to claim 1, wherein the correction regions that are smaller than said block containing the edge each comprise one pixel.

4. A method of processing a stereoscopic image, comprising:
generating a depth map by acquiring depth values from a first viewpoint image and a second viewpoint image, each of said depth values being assigned to respective blocks that each comprise a plurality of pixels, the depth values each representing how an image is shifted between the first viewpoint image and the second viewpoint image; and correcting, when it is determined that an edge of an object is included in a block based upon the depth values of blocks adjacent thereto, the depth value originally assigned to the block containing said edge in units of correction regions that are smaller than said block, thereby finely defining depth values within the block, wherein the depth value in said block containing the edge is corrected such that:

(1) when the depth value in a top adjacent block and the depth value in a left adjacent block are both greater than a first prescribed threshold in magnitude and the depth value in a bottom adjacent block and the depth value in a right adjacent block are both less than a second prescribed threshold in magnitude, the depth value in the block containing said edge is corrected using the depth value in the top adjacent block and the depth value in the bottom adjacent block;

(2) when the depth value in the top adjacent block and the depth value in the right adjacent block are both greater than a first prescribed threshold in magnitude and the depth value in the left adjacent block and depth value in the bottom adjacent block are both less than a second prescribed threshold in magnitude, the depth value in the block containing said edge is corrected using the depth value in the left adjacent block and the depth value in the right adjacent block;

(3) when the depth value in the bottom adjacent block and the depth value in the right adjacent block are both greater than a first prescribed threshold in magnitude and the depth value in the left adjacent block and depth value in the top adjacent block are both less than a second prescribed threshold in magnitude, the depth value in the block containing said edge is corrected using the depth value in the top adjacent block and the depth value in the bottom adjacent block; and (4) when the depth value in the left adjacent block and the depth value in the bottom adjacent block are both greater than a first prescribed threshold in magnitude and the depth value in the top adjacent block and depth value in the right adjacent block are both less than a second prescribed threshold in magnitude, the depth value in the block containing said edge is corrected using the depth value in the left adjacent block and the depth value in the right adjacent block.

5. A non-transitory storage medium that stores instructions executable by a computer, the instructions causing the computer to perform the following:

generating a depth map by acquiring depth values from a first viewpoint image and a second viewpoint image, each of said depth values being assigned to respective blocks that each comprise a plurality of pixels, the depth values each representing how an image is shifted between the first viewpoint image and the second viewpoint image; and correcting, when it is determined that an edge of an object is included in a block based upon the depth values of blocks adjacent thereto, the depth value originally assigned to the block containing said edge in units of correction regions that are smaller than said block, thereby finely defining depth values within the block, wherein the depth value in said block containing the edge is corrected such that:

(1) when the depth value in a top adjacent block and the depth value in a left adjacent block are both greater than a first prescribed threshold in magnitude and the depth value in a bottom adjacent block and the depth value in a right adjacent block are both less than a second prescribed threshold in magnitude, the depth value in the block containing said edge is corrected using the depth value in the top adjacent block and the depth value in the bottom adjacent block;

(2) when the depth value in the top adjacent block and the depth value in the right adjacent block are both greater than a first prescribed threshold in magnitude and the depth value in the left adjacent block and depth value in the bottom adjacent block are both less than a second prescribed threshold in magnitude, the depth value in the block containing said edge is corrected using the depth value in the left adjacent block and the depth value in the right adjacent block; (3) when the depth value in the bottom adjacent block and the depth value in the right adjacent block are both greater than a first prescribed threshold in magnitude and the depth value in the left adjacent block and depth value in the top adjacent block are both less than a second prescribed threshold in magnitude, the depth value in the block containing said edge is corrected using the depth value in the top adjacent block and the depth value in the bottom adjacent block; and (4) when the depth value in the left adjacent block and the depth value in the bottom adjacent block are both greater than a first prescribed threshold in magnitude and the depth value in the top adjacent block and depth value in the right adjacent block are both less than a second prescribed threshold in magnitude, the depth value in the block containing said edge is corrected using the depth value in the left adjacent block and the depth value in the right adjacent block.

6. The stereoscopic image processing device according to claim 1,
wherein the correction regions that are smaller than said block containing the edge each comprise one pixel.

7. The stereoscopic image processing device according to claim 2,
wherein the correction regions that are smaller than said block containing the edge each comprise one pixel.

* * * * *